United States Patent
Garcia et al.

(10) Patent No.: US 10,061,451 B2
(45) Date of Patent: Aug. 28, 2018

(54) TOUCH PANEL ASSEMBLY FOR A COMMUNICATION DEVICE

(71) Applicant: MOTOROLA SOLUTIONS, INC, Schaumburg, IL (US)

(72) Inventors: Jorge L. Garcia, Plantation, FL (US); Nicola Girotti, Copenhagen (DK); Salvador P. Magana, Wellington, FL (US); Ryan M. Nilsen, Pompano Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/879,842

(22) Filed: Oct. 9, 2015

(65) Prior Publication Data
US 2017/0300144 A1 Oct. 19, 2017

(51) Int. Cl.
*G06F 3/044* (2006.01)
*G06F 1/16* (2006.01)
*H04M 1/02* (2006.01)
*G06F 3/0354* (2013.01)
*G02F 1/1333* (2006.01)
*G06F 3/041* (2006.01)

(52) U.S. Cl.
CPC ......... *G06F 3/044* (2013.01); *G02F 1/13338* (2013.01); *G02F 1/133308* (2013.01); *G06F 1/1637* (2013.01); *G06F 1/1643* (2013.01); *G06F 1/1656* (2013.01); *G06F 3/03547* (2013.01); *G06F 3/0412* (2013.01); *H04M 1/0266* (2013.01); *G02F 2001/133331* (2013.01); *G02F 2202/28* (2013.01); *G06F 3/041* (2013.01); *H04M 2201/38* (2013.01)

(58) Field of Classification Search
CPC ................................ G06F 3/041; G06F 3/044
USPC ......................................................... 455/566
See application file for complete search history.

(56) References Cited

U.S. PATENT DOCUMENTS

| | | | | |
|---|---|---|---|---|
| 8,583,197 B2* | 11/2013 | Rofougaran | ............. | H01Q 5/00 370/329 |
| 2006/0133018 A1* | 6/2006 | Okuda | ............. | G02F 1/133308 361/679.26 |
| 2008/0165158 A1* | 7/2008 | Hotelling | ................ | G06F 3/044 345/174 |
| 2009/0002930 A1* | 1/2009 | Nakanishi | ............. | G06F 1/1616 |
| 2009/0080153 A1* | 3/2009 | Richardson | ............. | H04M 1/18 361/679.56 |
| 2009/0090694 A1* | 4/2009 | Hotelling | ................ | G06F 3/044 216/41 |
| 2009/0244025 A1 | 10/2009 | Hirota | | |
| 2009/0290294 A1 | 11/2009 | Prest | | |
| 2010/0110033 A1* | 5/2010 | Sakai | ...................... | G06F 3/045 345/173 |
| 2010/0225597 A1 | 9/2010 | Taylor | | |

(Continued)

*Primary Examiner* — Simon Nguyen
(74) *Attorney, Agent, or Firm* — Barbara R. Doutre

(57) ABSTRACT

An improved touch panel assembly (100) is provided. The touch panel assembly (100) comprises a bezel (102), a display (104), a touch panel (108), and a glass lens (110). The assembly (100) is formed to so that the touch panel (108) has a touch panel extension (112) extending beyond the glass lens (110). The touch panel extension (112) allows for a bumper (204) to edge mount to the glass lens (110) between the housing (202) and the module (100) and cover the touch panel extension (112) and sides of the assembly (100).

15 Claims, 2 Drawing Sheets

(56) References Cited

U.S. PATENT DOCUMENTS

| | | | |
|---|---|---|---|
| 2011/0300908 A1* | 12/2011 | Grespan | C03B 33/091 |
| | | | 455/566 |
| 2012/0092294 A1* | 4/2012 | Ganapathi | G02B 26/0833 |
| | | | 345/174 |
| 2013/0038542 A1* | 2/2013 | Kim | G06F 3/041 |
| | | | 345/173 |
| 2013/0100082 A1* | 4/2013 | Bakin | G06F 3/042 |
| | | | 345/175 |
| 2013/0169575 A1* | 7/2013 | Masuda | G06F 3/041 |
| | | | 345/173 |
| 2013/0321293 A1* | 12/2013 | Park | G06F 3/041 |
| | | | 345/173 |
| 2015/0378488 A1* | 12/2015 | Okamura | G06F 3/0412 |
| | | | 428/177 |

* cited by examiner

TOUCH PANEL ASSEMBLY FOR A COMMUNICATION DEVICE

FIELD OF THE INVENTION

The present invention relates generally to touch panels and more particularly to a touch panel assembly for a communication device.

BACKGROUND

A touch panel or touch screen is an input device and computer display screen used in tablet computers, smartphones and other communication devices. These panels are sensitive to pressure (or capacitance changes) and enable a user to interact with the computer by touching pictures, icons or words on the screen. In general there are three types of touch panel technology: resistive, surface wave, and capacitive. While many of today's consumer products incorporate a touch panel as part of a user interface, the incorporation of a touch panel into a public safety portable communication device has been far less prevalent due to the many challenges faced in designing such devices. Public safety radios utilized by law enforcement, fire rescue and other first responders tend to be operated under particularly harsh and rugged conditions where the radio is susceptible to being dropped and often subjected to wet or dusty conditions that can damage a touch panel.

Accordingly, there is a need for an improved touch panel assembly. An assembly that can be incorporated into a communication device having a limited form factor size and protecting the edges of the touch panel would be highly beneficial.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
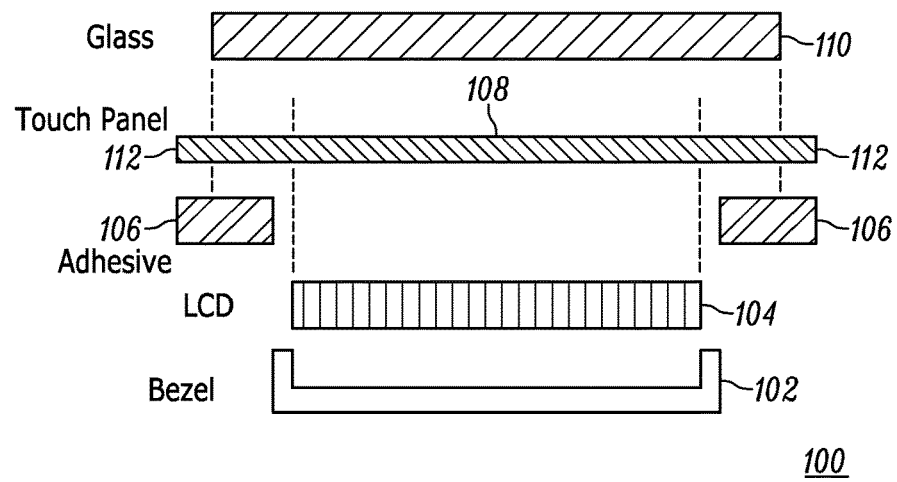
FIG. 1 is an exploded view of a touch panel assembly module in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an assembly for a touch panel for a communication device. For public safety applications the capacitive touch panel assembly is deemed desirable due to its resistance to scratching but tend to have more glass breakage. Generally, the assembly of a capacitive touch screen includes a stack-up of a liquid crystal display (LCD) display beneath the touch panel and a glass lens above the touch panel, along with sealing along the edges. However, devices using touch panel technology face challenges in protecting the assembly edge while reducing form factor size. Exposure of the glass near the edge of the product increases the risk of fracture in angled drops. This creates a challenge in protecting the perimeter of the glass lens without having the device take on a squared cross-sectional shape. The touch panel assembly provided by the various embodiments to be described herein comprises a display, a touch panel, and a glass lens, wherein the glass lens terminates before the touch panel area ends forming a touch panel perimeter extension extending beyond the display. The touch panel extension allows for a more gradual shaped module cross-section and for the inclusion of a substantial rubber protective bumper along a front surface of the extension. In accordance with the various embodiments, the touch panel extension also extends beyond the display allowing for an adhesive pad to be bonded along a bottom surface of the extension.

Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is an exploded view of a module for touch panel assembly 100 in accordance with some embodiments. The touch panel assembly 100 comprises a bezel 102, a display 104, adhesive pad 106, a touch panel 108, and a glass lens 110. The bezel 102 provides a plastic light guide backing behind the display 104. The display 104 may be a liquid crystal display (LCD), organic light-emitting diode (OLED) or other suitable display for use with a touch panel. The adhesive pad 106 is formed of an acrylic foam material having visco-elastic properties having sealing and high strength bonding qualities, such as such as 3M™ VHB. The touch panel 108 comprises a capacitive touch panel device, preferably formed of polyethylene terephthalate (PET) film and not glass. The glass lens 110 may be formed of glass, sapphire or other suitably clear, hard and scratch resistant substrate.

For assembly purposes, the display 104 is assembled within the bezel 102, the touch panel 108 is assembled to the display 104, and the glass lens 110 is assembled to the touch panel 108. Known process, bonding and coupling techniques can be utilized. In accordance with the embodiments, the touch panel 108 comprises a touch panel extension 112 extending beyond the display 104. The touch panel extension 112 allows for reduced glass lens width for contouring outer product shape inwards. Unlike most existing systems which have a glass lens extending well beyond the active areas of the touch panel and LCD display, the reduced glass width of glass lens 110 allows for narrowed contour of product. The touch panel extension 112 extends along first and second sides of the touch panel 108.

The touch panel 108 comprises touch panel sensors and traces, such as Indium Tin Oxide (ITO) traces for capacitive touch deposited on a film of polyethylene terephthalate (PET). The touch panel extension 112 does not contain ITO traces. Thus, the touch panel 108 does not contain ITO traces beyond the width of the glass lens 110.

Touch panel extension 112 extending beyond the display 104 allows placement of the adhesive pad 106. The adhesive pad 106 is bonded along a full perimeter of the touch panel 108 including the touch panel extension 112 to permit mounting to an electronic device, such as a communication device housing as will be shown in FIG. 2. Touch panel extension 112 extending beyond the edge of the glass lens 110 allows placement of a shock absorbing bumper, as will be shown in FIG. 2, while minimizing product width.

Unlike past devices that extend the glass lens beyond the touch panel, the assembly of the various embodiments extends the touch panel beyond the glass. Extending the touch panel beyond the glass provides improved shock absorption, a reduced visual thickness, and reduced visual width.

Figure 2:
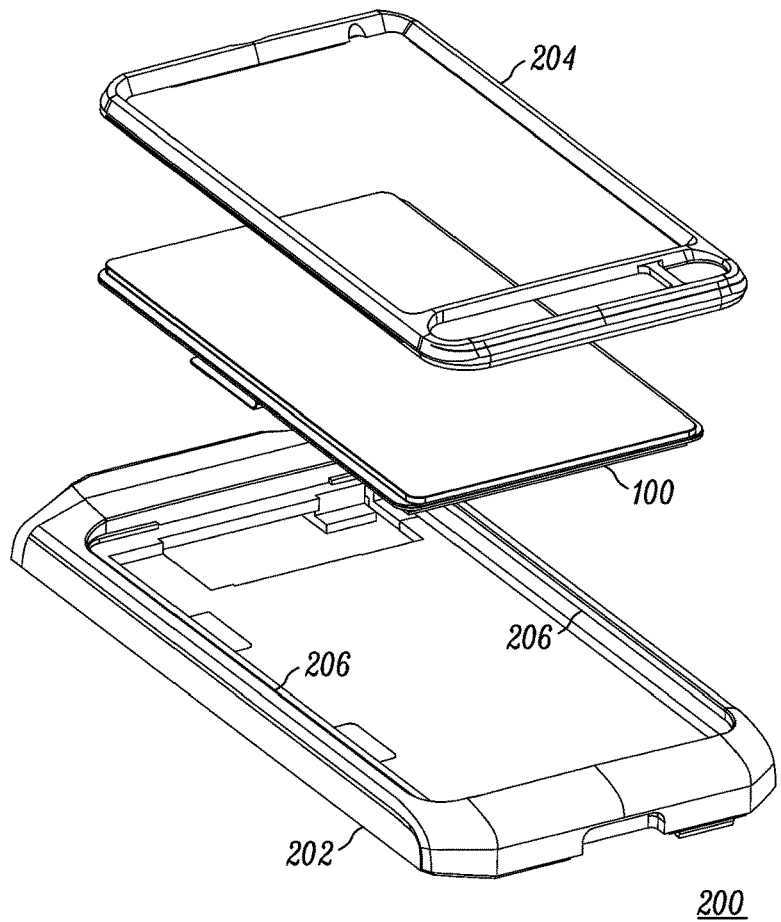
FIG. 2 shows a touch panel assembly module being inserted within a radio in accordance with some embodiments.

FIG. 2 shows an exploded view of a radio assembly 200 in which the touch panel assembly 100 of FIG. 1 is assembled within a radio in accordance with some embodiments. Radio assembly 200 is assembled by seating the module 100 within housing 202 and inserting the bumper 204 about the module 100. The housing may be made of polycarbonate or glass filled nylon or other suitable ruggedized material. The bumper 204 may be formed of viscoelastic or shock absorbing material, such as for example high density polyurethane materials and composites.

In accordance with the various embodiments, the touch panel 108 is only extended on two sides (lengthwise), which align within interior walls 206 of housing 202. Using the touch panel 108 with touch panel extensions 112 allows the glass lens to be reduced by, for example 1.8 mm. The benefit derived by minimizing the width of the glass lens 110 is to strengthen edge robustness and minimize breakage. This approach is far superior to overextended glass displays of the past which extended the glass lens over the touch panel by 2 mm and still incurred breakage.

While the two-sided touch panel extension 112 has proven to be effective in creating an overall robust edge, in a space saving and cost effective manner, a full perimeter touch panel extension surrounding the entire touch panel 108 could also be used. Thus, a full perimeter touch panel extension is also envisioned by the various embodiments.

Figure 3:
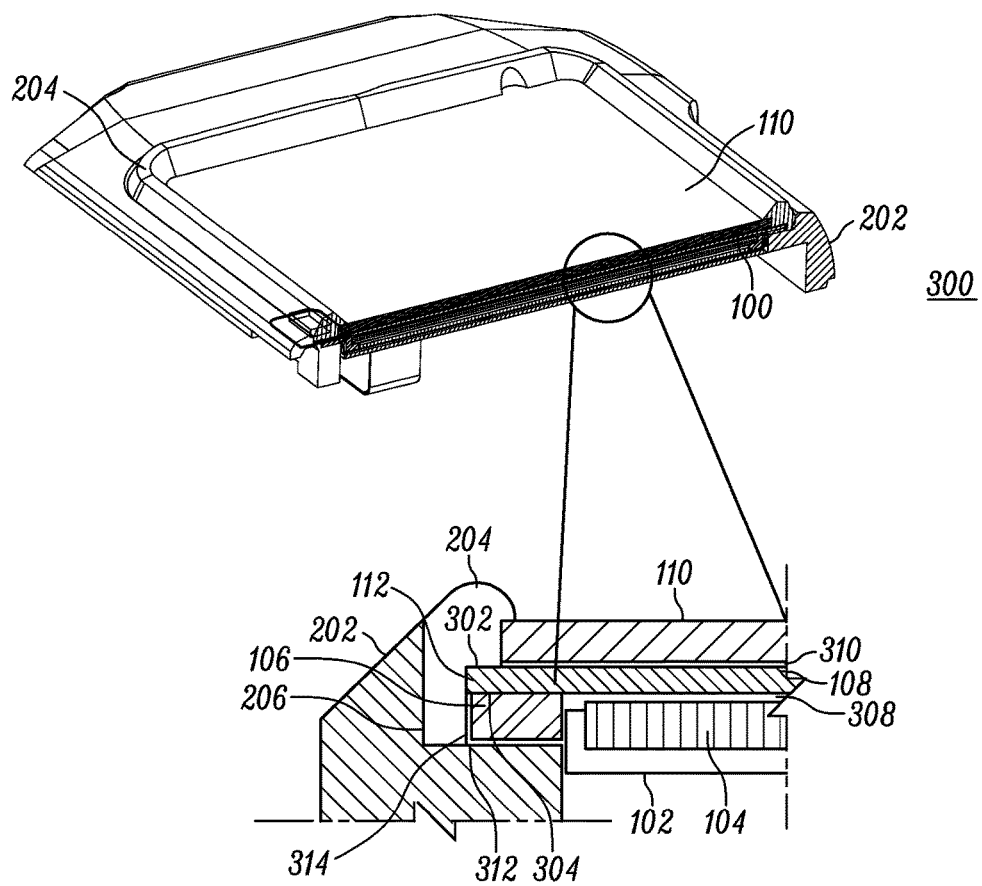
FIG. 3 is a partial view of a radio in accordance with some embodiments.

FIG. 3 shows a cross sectional assembly of a communication device, such as a portable radio or body worn accessory 300, in accordance with the embodiments. The radio 300 comprises housing 202 within which is coupled the module 100 of the various embodiments, wherein the bezel 102 has the display 104 seated therein. The touch panel 108 may be bonded, via a bonding material 308, such as optically clear adhesive (OCA) to the display 104. In accordance with the embodiments, the touch panel 108 has the touch panel extension 112 extending beyond the display 104. The glass lens 110 may be bonded to the touch panel 108, also by optically clear adhesive (OCA). The adhesive pad 106 is bonded along a full perimeter of the touch panel 108 including a bottom side 304 of the touch panel extension 112. The adhesive pad 106 is used for coupling the touch panel 108 to the radio housing 202 at an interior bottom wall 312 of the housing 202. The bumper 204 is insertably coupled to the housing 202 and at a front surface 302 of the touch panel extension 112 and to the interior walls 206 of the housing 202. The bumper 204 is thus compressibly fit against the front surface 302 of the touch panel extension 112.

The bumper 204 minimizes glass exposure of the glass lens 110 for drop protection while extending deep into the housing 202 along the sides of the glass lens 110, touch panel 108, and adhesive pad 106. The touch panel 108 having panel extensions 112 extending beyond glass lens 110 provides improved shock absorption, along with a reduced visual thickness and reduced visual width.

In accordance with a further embodiment, the touch panel extension 112, may be used to provide an extended user interface. The touch panel extension 112 of touch panel 108 may further comprises touch panel sensors and traces, such as Indium Tin Oxide (ITO) traces for capacitive touch deposited on a film of polyethylene terephthalate (PET). These sensors and traces may in accordance with this further embodiment be used to detect touch and provide enhanced user interface touch zones beyond the width of the glass lens 110.

Accordingly, there has been provided a touch panel assembly with improved edge robustness. Extending the touch panel beyond the glass lens provides improved shock absorption, along with a reduced visual thickness and reduced visual width. Public safety communication devices, such as portable radios and/or body worn accessories can benefit from the improved user interface and ruggedness of the touch panel formed in accordance with the various embodiments.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A touch panel assembly, comprising:
   a glass lens;
   a touch panel coupled to the glass lens, the touch panel having a touch panel extension that extends beyond the glass lens, wherein the touch panel extension extends only along first and second lengthwise sides of the touch panel;
   an adhesive pad bonded only along a full perimeter bottom surface of the touch panel including the bottom surface of the touch panel extension, thereby sealing the bottom surface of the touch panel; and
   a shock absorbing bumper coupled along sides of the glass lens, touch panel extension, and the adhesive pad, so as to compressibly fit against a front surface of the touch panel extension, the shock absorbing bumper minimizing exposure of the glass lens for drop protection.

2. The touch panel assembly of claim 1, further comprising a display assembled to the touch panel.

3. The touch panel assembly of claim 1, wherein the touch panel comprises traces for capacitive touch except on the touch panel extension.

4. The touch panel assembly of claim 1, wherein the touch panel is parallel to the cover glass.

5. A communication device, comprising:
- a housing comprising an interior bottom wall and interior side walls;
- a bezel;
- a liquid crystal display (LCD) seated within the bezel;
- a touch panel assembled to the LCD;
- a glass lens assembled to the touch panel, the touch panel extending beyond the glass lens as a touch panel extension, wherein the touch panel extension extends only along first and second lengthwise sides of the touch panel which align within the interior side walls of the housing;
- an adhesive pad bonded only along a full perimeter bottom surface of the touch panel including the bottom surface of the touch panel extension, thereby providing sealing to the bottom surface of the touch panel and to the interior bottom wall of the housing; and
- a bumper insertably coupled to the housing to extend to the interior bottom wall and along the interior side walls of the housing and along sides of the glass lens, touch panel extension, and the adhesive pad, so as to compressibly fit against a front surface of the touch panel extension, the bumper minimizing exposure of the glass lens for drop protection.

6. The communication device of claim 5, wherein the bumper is made of shock absorbing material.

7. The communication device of claim 5, wherein the communication device comprises a public safety portable radio or body worn accessory.

8. The communication device of claim 5, wherein the housing is made of polycarbonate or glass filled nylon.

9. The communication device of claim 5, wherein the touch panel is capacitive touch panel.

10. The communication device of claim 5, wherein the adhesive pad is made of acrylic foam material having visco-elastic properties.

11. The communication device of claim 5, wherein the touch panel comprises traces for capacitive touch except on the touch panel extension.

12. The communication device of claim 5, wherein the touch panel extension includes traces for capacitive touch thereby providing a user interface touch zone beyond the width of the glass lens.

13. The communication device of claim 5, wherein the touch panel extension allows for a minimized glass lens width for contouring an outer shape of the communication device inwards.

14. The communication device of claim 13, wherein the minimized glass lens width strengthens edge robustness and minimizes breakage.

15. The communication device of claim 5, wherein the touch panel is parallel to the cover glass.

* * * * *